United States Patent

Katzensteiner

[11] Patent Number: 5,421,591
[45] Date of Patent: Jun. 6, 1995

[54] SEALING ARRANGEMENT

[75] Inventor: Josef R. Katzensteiner, Passau, Germany

[73] Assignee: Zahnradfabrik Friedrichshafen AG, Germany

[21] Appl. No.: 916,831

[22] PCT Filed: Feb. 23, 1991

[86] PCT No.: PCT/EP91/00342

§ 371 Date: Aug. 5, 1992

§ 102(e) Date: Aug. 5, 1992

[87] PCT Pub. No.: WO91/13277

PCT Pub. Date: Sep. 5, 1991

[30] Foreign Application Priority Data

Feb. 26, 1990 [DE] Germany .................. 40 06 014.4

[51] Int. Cl.⁶ ............... F16J 15/16; F16J 15/32
[52] U.S. Cl. .................... 277/31; 277/36; 277/152; 277/164
[58] Field of Search ............ 277/24, 31, 35, 36, 277/37, 50, 152, 153, 164; 384/291, 486

[56] References Cited

U.S. PATENT DOCUMENTS

| | | | |
|---|---|---|---|
| 2,177,441 | 10/1939 | Pesarese | 277/152 |
| 2,267,930 | 12/1941 | Leonard, Jr. | 277/35 |
| 2,434,484 | 1/1948 | Chambers, Jr. | 277/152 |
| 3,511,512 | 5/1970 | Wheelock | 277/153 |
| 4,049,281 | 9/1977 | Bainard | 277/37 X |
| 4,277,072 | 7/1981 | Forch | 277/153 X |
| 4,325,557 | 4/1982 | Kawamoto | 277/153 X |
| 4,502,698 | 3/1985 | Collins | 277/50 X |
| 4,550,920 | 11/1985 | Matsushima | 277/134 |
| 4,566,701 | 1/1986 | Bomgardner | 277/152 X |
| 4,861,172 | 8/1989 | Annast et al. | 277/37 X |
| 4,962,936 | 10/1990 | Matsushima | 277/37 |
| 5,039,112 | 8/1991 | Ulrich et al. | 277/35 |

FOREIGN PATENT DOCUMENTS

| | | | |
|---|---|---|---|
| 0242370 | 12/1962 | Australia | 277/24 |
| 3642082 | 6/1987 | Germany . | |

OTHER PUBLICATIONS

Product Engineering, Nov. 1948 pp. 122-123.

Primary Examiner—Thomas B. Will
Assistant Examiner—John L. Beres
Attorney, Agent, or Firm—Davis, Bujold & Streck

[57] ABSTRACT

The invention concerns a sealing arrangement for use in steered axles of vehicles employed in agriculture and/or the building trade. The sealing arrangement (24) consists of separate seals (46, 47) which are assembled into a sealing set (48) by way of a sleeve (42). The sleeve (42) is firmly situated in relation to the component (25) to be sealed such as the drive shaft (26) of a steered axle (1). Steering movements departing from the straight ahead drive position produce a displacement of the sealing arrangement (24) from the outer space (21) in a direction toward the inner space (20) of the axle tube (3) of the axle (1).

23 Claims, 3 Drawing Sheets

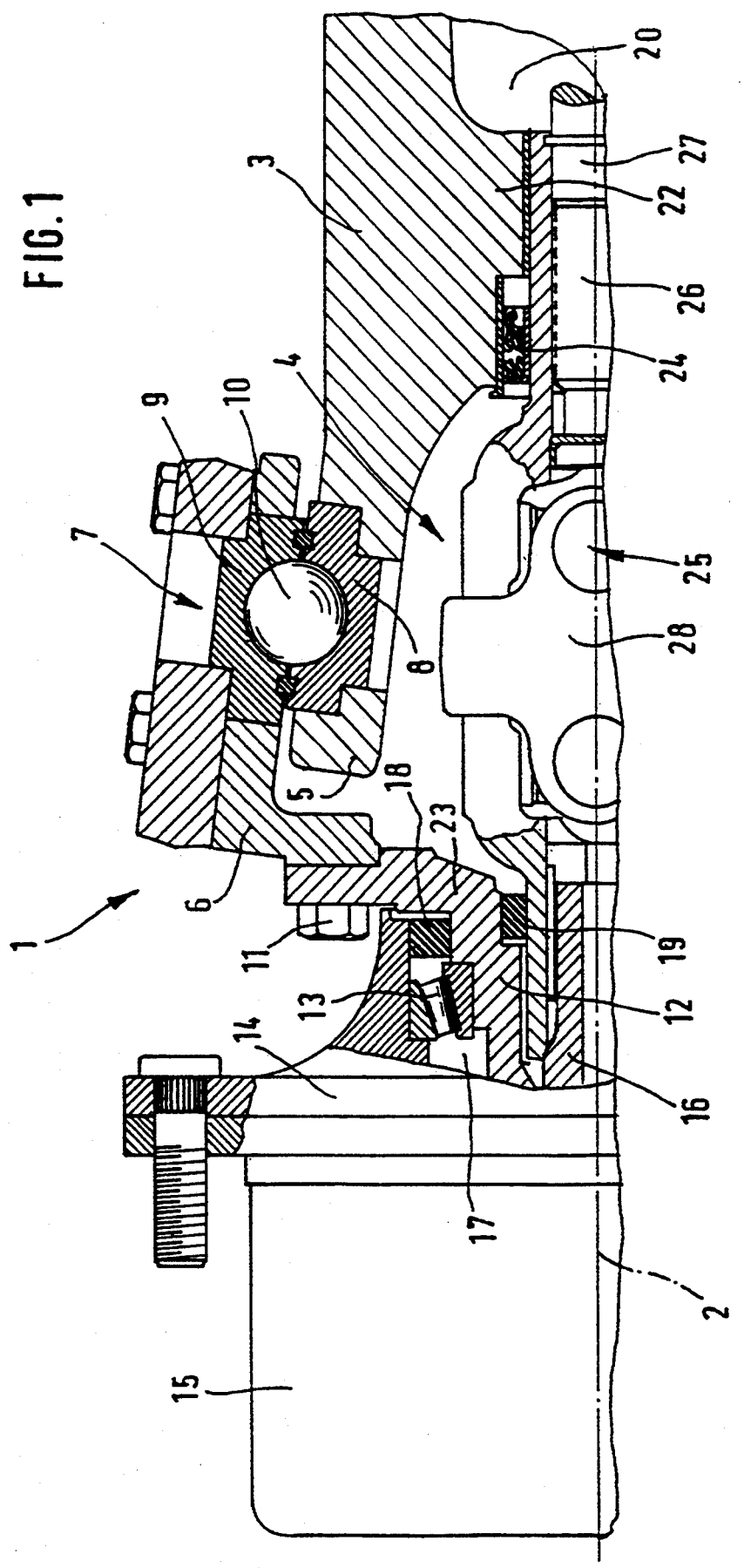

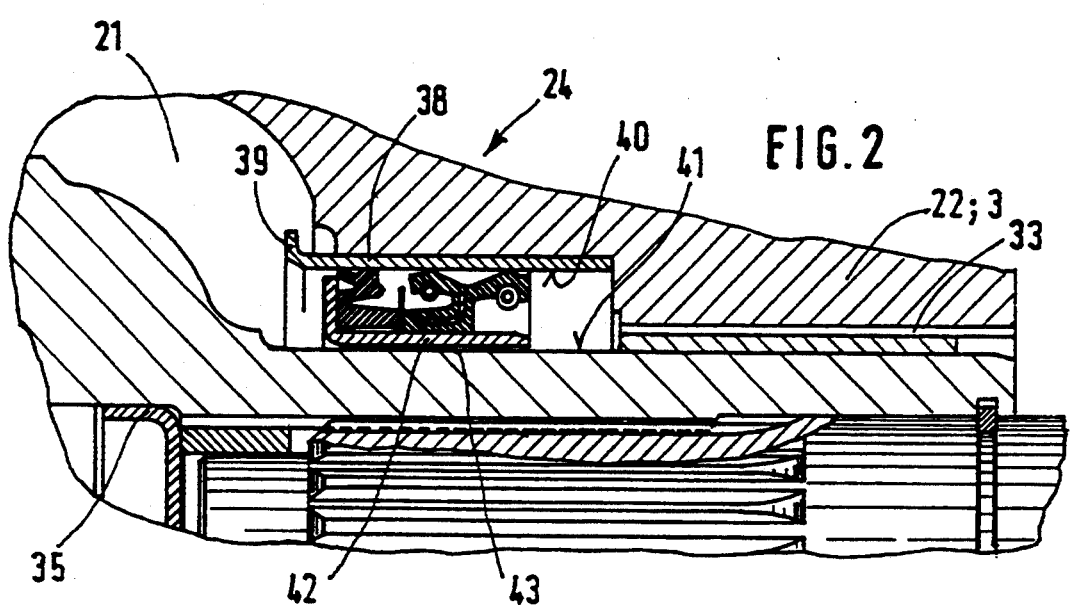
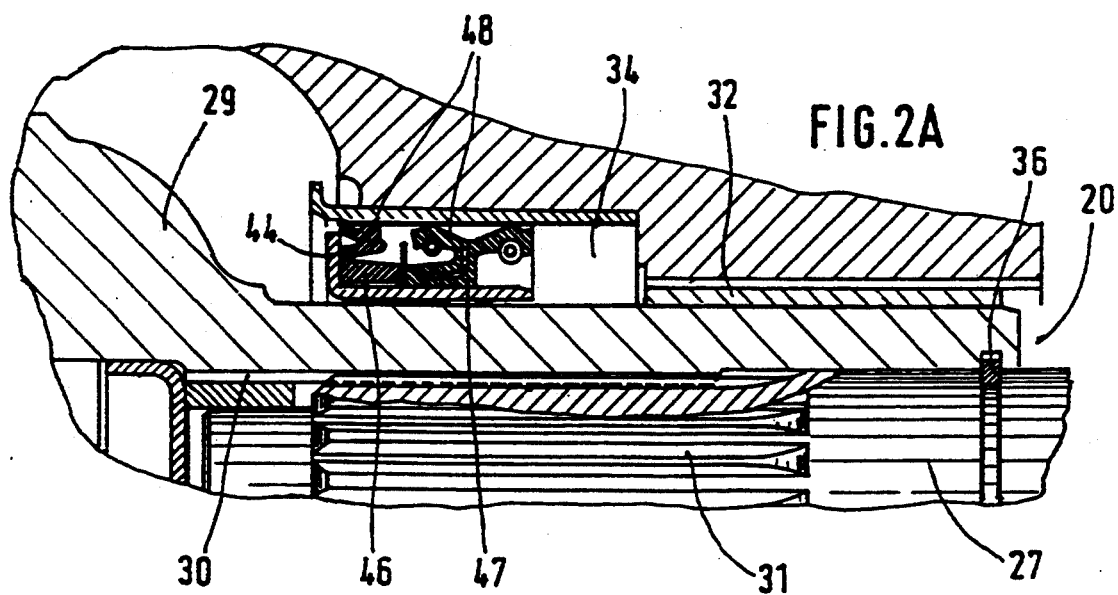
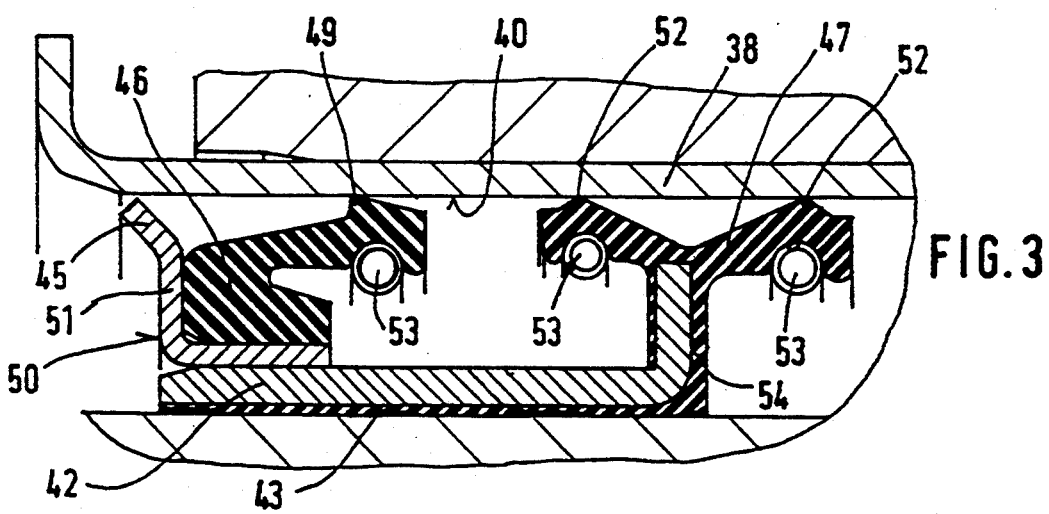

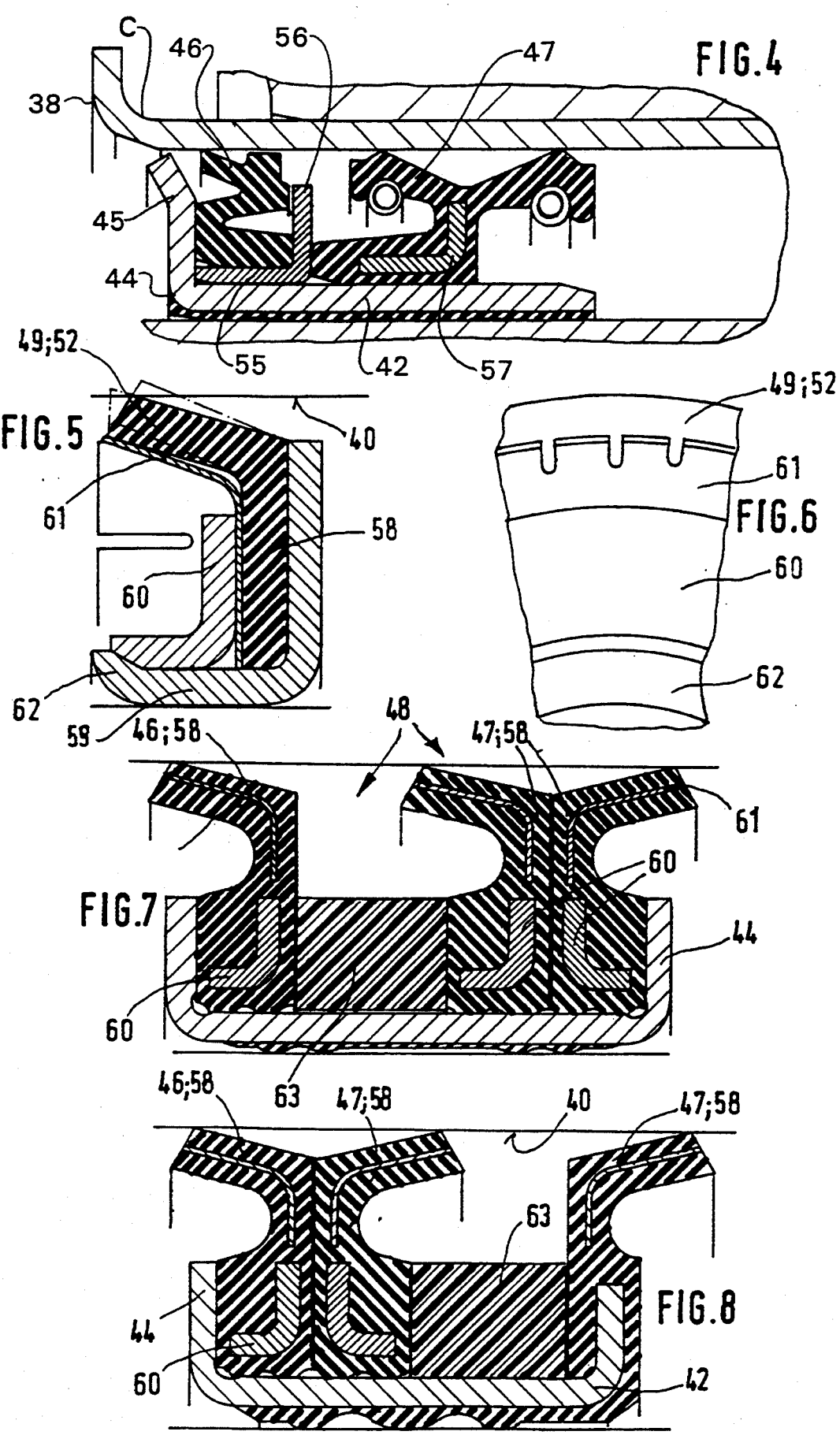

SEALING ARRANGEMENT

The invention concerns a sealing arrangement with seals for rotation and linear movement to seal a component, which is passed through a wall from an inner to an outer space and effects rotating and/or linear movement, the seals being assembled to form a sealing set by means of a sleeve which is stationary in relation to the component.

Sealing arrangements of the kind mentioned above are to be found mainly in vehicles used in agriculture or the building trade. They are used, for instance, in steering and rigid axles or transmissions. In the practice, such sealing arrangements are exposed to the most unfavorable conditions. In the harvest of rice, agricultural harvesters are used in wet, slimy ground. Sealing arrangements adequate for said vehicles must ensure a perfect sealing under difficult external conditions. But at the same time, the expense for their production, assembly and maintenance of spare parts must be low.

In a sealing arrangement known already (prospectus of the firm Carraro: "Axles and Transmissions", imprint: 115256-09/87), a sealing arrangement for sealing the axle bridges is constructed in a manner such that a scraper and a shaft sealing ring concentrically and snugly surround the axially movable part of a double universal joint. Although such a sealing arrangement is of simple construction and inexpensive to make, a long duration is not ensured under the extreme conditions of use described.

The invention is based on the problem of providing a sealing arrangement which ensures a sufficiently long useful life even under extreme conditions of use while maintaining a simple construction.

The problem on which the invention is based is solved by the fact that the seals abut with external sealing and scraping elements on a bushing which is firmly connected with the wall. By virtue of the firm connection of the sleeve of the sealing arrangement with the component such as an axle half shaft of a steering axle of an agricultural vehicle, when the steerable wheels are guided into a path, the dirt is not passed directly toward the sealing arrangement but the sealing arrangement moves toward the axle center thus evading the dirt. With the construction principle according to the invention, it is possible to rule out the danger of damage due to caked dirt (soil, mud) or ice, since adhering particles are carried along in a steady position by the component and are not shifted against a stationary seal.

Another advantageous feature of the invention consists in that the sleeve has a collar that faces the outer space. The collar of the sleeve performs the function of a scraper of dirt. Said scraper is effective when the driven steering wheels are returned to their position corresponding to the straight ahead drive. The scraper is specially effective in the cases where the vehicle has been stopped with the driven steering wheels and dirt incrustation resulting in the outer space in the area of the sealing arrangement. In this manner, dried impurities (soil, mud or the like, or ice also) are reliably removed from the area of the sealing arrangement as soon as the vehicle is put in operation and the driven steering wheels are carried over to the straight ahead position.

By virtue of the configuration of the collar of the sleeve, it is possible in addition to affect the centrifugal effect. It is specially advantageous if the collar has an edge inclined in a direction toward the outer space. A high centrifugal effect is obtained due to said collar.

The sealing arrangement according to the invention is primarily adequate for sealing a drive shaft of a steered axle of a vehicle used in agriculture or the building trade, which is passed toward a hub from an axle bridge, that is, an inner space, through an outer space where the double universal joint rotates. In this arrangement, when a steering movement is introduced, the sleeve moves from its position corresponding to the straight ahead drive and relative in respect of the outer space in a direction toward the inner space. A specially long duration and sealing effect of the sealing arrangement can be obtained when the shaft sealing ring has two sealing lips and the scraper at least one scraping lip, wherein—in relation to the longitudinal direction of the component (of the drive shaft)—the individual distances of the sealing and scraping lips from each other are greater than the linear travel of the component. In this arrangement each sealing and scraping lip has its own bearing race. The wear and tear of the sealing arrangement is slight inasmuch as no "overtravel" of the bearing races occurs, since the axial travel of the component such as the drive shaft is smaller than the distances of the sealing and scraping lips.

The bushing can be produced inexpensively by a deep-drawing part whose inner cylinder surface is perfectly drawn or ground, if necessary. In this connection it is likewise advantageous to increase the resistance to wear of the bushing by adequate treatment methods. To increase the resistance to wear, casehardening or tempering steels which are casehardened or induction hardened can be used. The surface of the bushing can be made specially resistant by bonding or a nitriding processes or by galvanic surface coating.

Since the bushing has to be renewed when the sealing arrangement is replaced, it is advantageous to provide the bushing with an extractor collar. The latter can have two tapholes which substantially facilitate the removal of the thread bolts by screwing in. The bushing can have an elastic external coating whereby a tight connection with the wall is ensured in the first place, for instance, the bore in an axle bridge.

If the drive shaft is mounted in the area of the wall in a bearing bush, it is particularly advantageous to provide on the external diameter of the bearing bush at least one groove connected with the inner space of the axle bridge. This step prevents the occurrence of any pressure buildup and of any under pressure on the seals of the sealing arrangement in the presence of axial movements. The groove produces a pressure balance between the space of the sealing arrangement and the inner space of the axle bridge. The latter is ventilated via a venting valve.

A stable support of the scraper results when it abuts on one side on the collar and on the other on a web of a supporting angle. The collar of the sleeve facing the outer space can also be formed by a support ring which is firmly connected with the sleeve in a manner such that a web faces the outer space. The support ring, which stabilizes the scraper, thus performs a double function.

According to another advantageous feature of the invention, a specially inexpensive sealing arrangement can be obtained by the fact that the individual seals are structurally identical sealing rings. Two sealing rings conveniently form a V-shaped sealing element which, with another sealing ring axially spaced, forms the sealing set. A sealing ring of the V-shaped sealing element forms the scraper while the remaining sealing rings form the sealing elements for the rotating movement.

Other essential features of the invention and the advantages resulting therefrom are to be seen from the description that follows of several embodiments with reference to the drawings.

In the drawings:

FIG. 1 is the diagrammatic illustration of a longitudinal section of the upper part of a driven axle;

FIG. 2 and FIG. 2A is and a first sealing arrangement in the area of a wall of the axle according to FIG. 1;

FIG. 3 and FIG. 4 show other sealing arrangements;

FIG. 5 is the diagrammatic illustration of a longitudinal section of an individual seal;

FIG. 6 is a partial front view of the seal according to FIG. 5; and

FIG. 7 and FIG. 8 show other sealing arrangements.

In FIG. 1 a driven axle 1, of a vehicle used in agriculture or the building trade, is partly shown and the vehicle itself is not shown. The figure shows a diagrammatic longitudinal section through the upper part of the axle 1.

Insofar as not expressly additionally explained in detail, indications concerning the spatial arrangement or extension of individual components are to be understood as follows:

"left"=lying to the left in the drawing,
"right"=lying to the right in the drawing,
"above"=lying above in the drawing,
"beneath"=lying beneath in the drawing,
"outside" or
"outer"=extending radially away from a longitudinal central line 2 and
"inside" or
"inner"=extending toward the longitudinal central line 2

A stationary axle tube 3 converts on its left end to a swivel head 4. The swivel head 4 can be shaped as a fork or a ball. The upper leg 5 can be seen from the drawing.

A pivot housing 6 is tiltably mounted opposite the stationary axle tube 3 over two axle leg bearings of which the upper knuckle bearing 7 is shown. The knuckle bearing 7 is formed by a lower ball cup 8, an upper ball cup 9 and a ball 10.

A hub carrier 12 is secured by means of screws 11 to the pivot housing 6. A wheel hub 14 is rotatably mounted upon the hub carrier 12 via a tapered roller bearing 13. The wheel hub 14 is non-rotatably connected with a substantially cup-shaped end output housing 15. In the interior of the end output housing 15 is accommodated a stepdown transmission such as a planetary transmission, itself not shown. Of said stepdown transmission, a sun gear shaft 16 projects to the right from the end output housing 15. The interior space 17 of the end output housing 15 defined by the wheel hub 14 is outwardly sealed via two seals 18 and 19. The seal 18 is non-rotatably accommodated in the wheel hub 14 and the seal 19 is non-rotatably accommodated in the hollow axle 12.

The axle tube 3 has an inner space 20. Between the inner space 17 of the end output housing 15 and the inner space 20 of the axle tube 3 is an outer space 21 which is substantially open to the outside and is delimited by the swivel head 4 and the pivot housing 6.

The outer space 21 is separated on one side from the inner space 20 of the axle tube 3 by a wall 22 of the axle tube 3 and on the other side from the inner space 17 of the end output housing 15 by a wall 23 of the hollow axle 12.

In the embodiment shown in FIG. 1, a sealing arrangement 24 for sealing a component 25 is provided within the wall 22. The component 25 is passed from the inner space 20 of the axle tube 3 to the outer space 21 or from the inner space 17 of the end output housing 15 to the outer space 21. The component 25 performs rotating and linear motions.

In the case of the described steerable axle 1 for an agricultural vehicle, the component 25 is a drive shaft 26. The drive shaft 26 is composed of several parts and produces a driving connection of a differential transmission, not shown itself, to the driven end output housing 15. The drive shaft 26 consists in detail of an axle half shaft 27, a double universal joint 28 and the already mentioned sun gear shaft 16. The drive shaft 26 which drives the end output housing 15 rotates during the operation. On said rotation movement is superposed a shifting movement in an axial direction (in the direction of the longitudinal central line 2), which is a consequence of the swiveling movements of the pivot housing 6 while steering.

In the embodiment of FIG. 1 the sun shaft 16 is firmly situated in an axial direction. Consequently, upon steering movements on the drive side of the double universal joint 28, that is, on the right side of the double universal joint 28, an axial shifting movement occurs. The axle half shaft 27 is moved to the right when, as shown, the wheels are guided into path from a straight ahead position. But the arrangement shown can readily be changed in such a manner that the axle half shaft 27 be firmly mounted and perform no axial shifting motion. The axial shifting motion then appears on the opposite side of the double universal joint 28. In this case, the sealing arrangement 24 would have to be provided on said side.

Other details of the arrangement in the area of the wall 22 of the axle tube 3 are to be deduced from the drawing according to FIG. 2. A drive-side fork sleeve 29 of the double universal joint 28 has an internal spline 30 which produces with an external spline 31 of the axle half shaft 27 a non-rotatable connection between the double universal joint 28 and the axle half shaft 27. The fork sleeve 29 is rotatably and axially shiftably mounted in the area of the wall 22 in a bushing 32. The bushing 32 or the wall 22 has an axially pointed groove 33. The groove 33 produces a connection between an annular space 34 and the inner space 20 of the axle tube 3. The groove 33 creates a pressure balance between the annular space 34 an the inner space 20.

The fork sleeve 29, in the area of its internal spline 30, is closed toward the outer space 21 by a cover 35. A guard ring 36 is provided in order to secure, in an axial direction, the fork sleeve 29 upon the axle half shaft 27. The fork sleeve 29 and the axle half shaft 27 can also be designed in one piece.

Here below is explained in detail the construction and operation of the sealing arrangement 24 for sealing the component 25, which is passed through the wall 22 from an inner space 20 to an outer space 21 and performs rotating and linear movements.

A bushing 38 is firmly inserted in a bore 37 of the wall 22 but removably if necessary. The end of the bushing 38 facing the outer space 21 is designed as extractor collar 39. The extractor collar 39 facilitates the exchange of the bushing 38 and, for this purpose, can be provided with two bolt holes which are diametrically opposite to each other and extend in a longitudinal direction. If desired, the bushing 38 may have an elastic external coating applied thereto.

The bushing 38 is a deep-drawn part whose inner cylinder surface 40 is perfectly drawn or ground. The resistance to wear of the bushing 38 is advantageously improved by adequate treatment methods. For this purpose, the bushing 38 can be casehardened or induction hardened, bonderized, or nitrocarbureted, or burnished. The fork sleeve 29 has an outer cylinder surface 41 which is preferably ground. Upon said outer cylinder 41 is firmly situated, in relation to the component 25 (fork sleeve 29 and axle half shaft 27), a sleeve 42 of the sealing arrangement 24. In this connection, it is advantageous to provide the sleeve 42—at least partly—with a rubber coating 43. The rubber coating produces a tight abutment of the sleeve 42 on the outer cylinder surface 41 of the fork sleeve 29. Instead of a rubber coating 43, a commercially available sealing lacquer or a sealing composition can be used. The arrangement described has the further advantage that the diameter of the outer cylinder 41 can have the same size over its whole axial length. This constant diameter facilitates the assembly of the sleeve 42 and the support of the fork sleeve 29.

The sleeve 42 has a collar 44 which faces the outer space 21. The external diameter of the collar 44 is slightly smaller than the diameter of the inner cylinder 40 of the bushing 38. The collar 44 can have an edge 45 inclined in a direction toward the outer space 21 (see FIGS. 3 and 4).

Individual seals 46 and 47 are assembled by the sleeve 42 into a sealing set 48. The seal 46 which faces the outer space 21 is formed by a scraper while the seal 47 which faces the inner space consists of a shaft sealing ring.

The sealing arrangement 24 explained above in relation to FIG. 1 and 2 serves to seal the drive shaft 26 (axle half shaft 27, double universal joint 28 and sun gear shaft 16) of a steered axle 1 of a vehicle used in agriculture. The drive shaft 26 is passed from an axle tube 3, through an outer space 21, to an end output housing 15. When a steering movement is introduced, the sleeve 42 moves from its position relative to the outer space 21 and corresponding to the straight ahead position, in accordance with FIG. 1 and 2, in direction to the inner space 20 of the axle tube 3. The seals 46 and 47 of the sealing set 48 of the sealing arrangement 24 are seals having external sealing and scraping elements which tightly abut against the inner cylinder 40 of the bushing 38. It can be readily seen that when a steering movement is introduced, no axial shifting of the drive shaft 26 against stationary seals occurs. The proposed sealing arrangement 24 rather constitutes a deviation from the conventional construction principle. When a steering movement is introduced, the sealing set 48 gives way, since it performs at the same time the axial shifting movement—oriented away from the outer space 21—in a direction toward the inner space 20 of the axle tube 3. Expressed in a simplified manner, the sealing arrangement 24 is provided in such a manner that the sealing set 48 deviates the dirt which, a shown by experience, accumulates in the area of the fork sleeve 29 in the outer space 21. When the wheels are steered back, the collar 44 of the sleeve 42 takes care of scraping the coarse dirt while the seal 46, designed as a scraper, entirely cleanses the inner cylinder 40 of the bushing 38. To lengthen the useful life of the sealing set 48, it is advantageous to fill the space between the seals 46 and 47 and the sealing lips 52 with long-lasting lubricant preferably having a high melting point. This durability lubrication is effected when assembling the sealing set 48.

The action of the collar 44 of the sleeve 42 as a scraper is specially advantageous when the vehicle has been stopped with locked wheels and dirt incrustation have resulted from drying or freezing moisture.

In FIG. 3, the details of another embodiment of a sealing arrangement 24 are to be seen. The seal 46 designed as a scraper has a scraping lip 49 spring-loaded in a direction toward the inner cylinder 40 of the bushing 38. To reinforce the seal, a support ring 50 pressed upon the outer diameter of the sleeve 42 is provided. A vertically pointed web 51 assumes the function of the collar 44.

The seal 47 is designed as a shaft sealing ring with external sealing lips 52. A respective compression spring 53 produces a spring-loaded abutment of the sealing lips 52 against the inner cylinder 40 of the bushing 38.

As can be seen from the drawing, the shaft sealing ring 47 can be made internal with the sleeve 42. In this case an elastic bottom cover 54 of the shaft sealing ring converts into the elastic inner coating (rubber coating 43) of the sleeve 42. The annular spaces which—in relation to the inner cylinder 40 of the bushing 38—are defined between the scraping lip 49 and the sealing lip 52 or both sealing lips 52 of the radial shaft sealing ring are filled with long-life lubricant.

The sealing arrangement 24 reproduced in FIG. 4 coincides substantially with that of FIG. 2. The seal 46, designed as a scraper, is reinforced by a support ring 55. The support ring 55 fastens the scraper in the area of the outer diameter of the sleeve 42 and additionally supports it with a vertically pointed leg 56. The radial shaft sealing ring has for reinforcement another support ring 57.

Other advantageous designs of the sealing arrangement 24 result from the consideration that the individual seals 46 and 47 can be assembled from identically constructed sealing rings 58. The basic construction of a sealing ring 58 with which said consideration is borne in mind is to be deduced from FIG. 5. The sealing ring 58 is contained in a housing 59. This housing 59 can be a separate component, but said housing can also be formed by the sleeve 42. A support ring 60 takes care of a sufficient reinforcement of the seal ring 58. The elastic abutment of the scraping lip 49 or of the sealing lip 52 on the inner cylinder 40 of the bushing 38 is ensured by means of a disc spring 61. When assembling, the seal 58 is first slipped upon the housing 59. The disc spring 61 is applied thereafter. The support ring 60 is finally added and the arrangement is closed by beading the edge 62. In case the housing 59 is a separate component, the sealing set 48 is formed by three sealing rings 58 assembled by the sleeve 42. A similar arrangement is to be deduced from the reproduction according to FIG. 7. The sleeve 42 has two collars 44 which assemble the sealing rings 58 into the sealing set 48. The seal 46 designed as a scraper and the seal 47 which acts as radial shaft sealing ring are separated from each other by a spacer 63. Departing from the embodiment of FIG. 5, the support rings 60 and the disc springs 61 are not separate components. Said elements are integrated components of the sealing rings 58. The sealing rings 58 can thus be produced at a specially favorable cost.

The sealing arrangement 24 according to FIG. 8 makes clear that other structural changes are possible without abandoning the principle of the invention. In said sealing arrangement, the seal 46 assumes the function of a scraper while the sealing rings 58 situated to its right assume the task of the radial shaft sealing ring. The external sealing ring 58 situated to the right is made integral with the sleeve 42. The spacer 63 is between the sealing rings 58.

Reference numerals
1 axle
2 longitudinal central line
3 axle tube
4 swivel head
5 leg
6 pivot housing
7 upper knuckle bearing
8 lower ball cup
9 upper ball cup
10 ball
11 screws
12 hub carrier
13 taper roller bearing
14 wheel hub
15 end output housing
16 sun wheel shaft
17 inner space
18 sealing ring
19 sealing ring
20 inner space
21 outer space
22 wall
23 wall
24 sealing arrangement
25 component
26 drive shaft
27 axle half shaft
28 double universal joint
29 fork sleeve
30 internal spline
31 external spline
32 bearing bush
33 groove
34 annular space
35 cover
36 guard ring
37 bore
38 bushing
39 extractor collar
40 inner cylinder
41 outer cylinder
42 sleeve
43 rubber coating
44 collar
45 edge
46 seal
47 seal
48 sealing set
49 scraper lip
50 support ring
51 web
52 sealing lip
53 compression springs
54 bottom cover
55 support ring
56 leg
57 support ring
58 sealing ring
59 housing
60 support ring
61 disc spring
62 edge
63 spacer

I claim:
1. A sealing assembly (24) having a plurality of seals (46, 47) for sealing a rotatable and linear movable component (25) in combination with a steered axle (1) of a vehicle having a movable component (25) being passed through both an axle tube (3) and an outer space (21) to an end output housing (15) for facilitating driving of a vehicle, said sealing assembly (24) being suitable for use in one of an agriculture and a building trade and comprising:
an outer bushing (38) having a bore extending therethrough which defines an inner bore surface, and a sleeve (42) being accommodated within said bore; and
one of said plurality of seals is a shaft sealing ring (47) having two sealing lips (52) and a second of said plurality of seals is a scraper (46) having at least one scraping lip (49), and said plurality of seals (46, 47) being assembled into a sealing set (48);
wherein an inner surface of said sleeve (42) is firmly secured to the movable component (25) and an exterior surface of said bushing (38) is firmly secured to the axle tube (3); said sealing set (48) is supported by the outer surface of said sleeve (42) and completely spans an annular space located between the inner bore surface of said bushing (38) and the outer surface of said sleeve (42) for sealing said annular space, and said sealing and scraping lips (52, 49) of said sealing set (48) sealing abut against the inner surface of said bushing (38) in a manner such that the sealing and scraping functions of the seals are combined, whereby, upon introduction of a steering movement of the movable component (25) during operation of the vehicle incorporating said sealing assembly (24), said sleeve (42) and said sealing set (48) are displaced to and fro along the inner bore surface of said bushing (38) from a first end of said busing (38) located adjacent the outer space (21) toward an opposed end of said bushing (38) located adjacent an inner space (20), and a longitudinal distance between said scraping lip (49) and an adjacent one of said two sealing lips (52) of said shaft sealing ring (47), in relation to a longitudinal direction of said movable component (25), is greater than a longitudinal travel distance of said movable component (25) such that no overlap occurs between respective longitudinal paths of travel of said sealing lips (52) and said scraping lips (49).

2. A sealing arrangement according to claim 1, wherein said sleeve (42) has a collar (44) which is located adjacent the first end of said bushing and facing said outer space (21).

3. A sealing arrangement according to claim 2, wherein said collar (44) has an edge portion (45) inclined in a direction toward said outer space (21) and away from said sealing set.

4. A sealing arrangement according to claim 1, wherein said sealing set (48) is formed by a scraper (46), which extends toward said outer space (21), and a shaft sealing ring (47) which extends toward both said inner space (20) and said outer space (21).

5. A sealing arrangement according to claim 1, wherein said sleeve (42) has an elastic inner coating (43).

6. A sealing arrangement according to claim 1, wherein said inner surface (40) of said bushing (38) is cylindrical and is finished.

7. A sealing arrangement according to claim 6, wherein said bushing (38) is treated by a treatment process to increase said bushing's resistance to wear.

8. A sealing arrangement according to claim 1, wherein said bushing (38) is provided with an extractor collar (39).

9. A sealing arrangement according to claim 1, wherein a drive shaft (26) is accommodated by said axle tube (3) within a bearing bush (32) and the bearing bush (32) has a groove (33) which communicates with said inner space (20 or 17).

10. A sealing arrangement according to claim 2, wherein one of said plurality of seals is a scraper (46), and said scraper, in relation to a longitudinal cross section of said sleeve (42), abuts on one side against said collar (44) and on an opposite side abuts against a leg (56) of a support ring (55).

11. A sealing arrangement according to claim 10, wherein said support ring (55) supports said scraper (46) and said sleeve (42) supports said support ring (55).

12. A sealing arrangement according to claim 2, wherein said collar (44) is formed by a support ring (50) which is firmly connected with said sleeve (42) and said support ring (50) has a web (51) facing said outer space (21).

13. A sealing arrangement according to claim 1, wherein one of said plurality of seals is a shaft sealing ring (47) which is made integral with said sleeve (42).

14. A sealing arrangement according to claim 5, wherein one of said plurality of seals is a shaft sealing ring (47) and a bottom portion (54) of said shaft sealing ring (47) lines an inner surface of said sleeve and forms the elastic inner coating (43) thereon.

15. A sealing arrangement according to claim 1, wherein said plurality of seals (46, 47) comprise at least two sealing rings (58) which have identical constructions.

16. A sealing arrangement according to claim 15, wherein said two identical construction sealing rings (58) form a V-shaped seal (47 or 46 and 58) which, with another sealing ring (58) spaced an axial distance therefrom, forms said sealing set (48).

17. A sealing arrangement according to claim 15, wherein said sealing rings (58) are each prestressed by a respective disc spring (61).

18. A sealing arrangement according to claim 15, wherein said sealing rings (58) are reinforced by an angled support member (60).

19. A sealing arrangement according to claim 1, wherein a fork sleeve (29) supports said sleeve (42) and said sleeve is prevented from moving axially along said movable component (25) by at least one guard ring (36) engaging with both said fork sleeve (29) and said movable component (25).

20. A sealing arrangement according to claim 1, wherein said sealing and scraping lips (52, 49) are each prestressed by a coiled compression spring (53).

21. A sealing arrangement according to claim 1, wherein said sealing set is filled with a lubricant.

22. A sealing assembly (24), having a plurality of seals (46, 47), in combination with a rotatable and linear movable component (25) of a steered axle (1) of a vehicle, said sealing assembly (24) sealing said movable component (25) with respect to an axle tube (3), the movable component (25) being passed through the axle tube (3) and an outer space (21) to an end output housing (15) for facilitating driving of a vehicle;

wherein said sealing assembly (24) comprises an outer bushing (38) which accommodates a sleeve (42) therein;

one of said plurality of seals is a shaft sealing ring (47) having two sealing lips (52) and a second of said plurality of seals is a scraper (46) having at least one scraping lip (49), and said plurality of seals (46, 47) are assembled into a sealing set (48);

an inner surface of said plurality of seals (46, 47) is firmly secured to and supported by an outer surface of said sleeve (42), said sleeve (42) is firmly secured to an outer radial surface of the movable component (25), said plurality of seals (46, 47) span an annular space defined between said bushing (38) and said sleeve (42) and abut against an inner surface of said bushing (38) via said sealing and scraping lips (52, 49) for cooperatively sealing said annular space, and said bushing (38) is firmly secured to an inner surface of the axle tube (3) of the vehicle; and said sealing set (48) and said sleeve (42), upon operation of the vehicle incorporating said sealing arrangement (24) and upon introduction of steering movement to the movable component (25), are displaced to and fro along the inner surface of said bushing (38) from an end of said bushing located adjacent said outer space (21) to an opposed end of said bushing located adjacent an inner space (20), and a longitudinal distance between said sealing lips (52) and said scraping lip (49), in relation to a longitudinal direction of said movable component (25), is greater than a longitudinal travel distance of said movable component (25) such that no overlap occurs between respective longitudinal paths of travel of said sealing lips (52) and said scraping lips (49).

23. A sealing assembly (24) having a plurality of seals (46, 47) for sealing a rotatable and linear movable component (25) of a steered axle (1) of a vehicle passed through both an axle tube (3) and an outer space (21) to an end output housing (15) for facilitating driving of a vehicle, said sealing assembly (24) being suitable for use in one of an agriculture and a building trade and comprising:

an outer bushing (38) having a bore extending therethrough which defines an inner bore surface, and a sleeve (42) being accommodated within said bore; and one of said plurality of seals is a shaft sealing ring (47) having two sealing lips (52) and a second of said plurality of seals is a scraper (46) having at least one scraping lip (49), and said plurality of seals (46, 47) being assembled into a sealing set (48);

wherein an inner surface of said sleeve (42) is firmly securable to the movable component (25) and an exterior surface of said bushing (38) is firmly securable to the axle tube (3); said sealing set (48) is supported by an outer surface of said sleeve (42) and completely spans an annular space located between the inner bore surface of said bushing (38) and the outer surface of said sleeve (42) for sealing said annular space, and said sealing and scraping lips (52, 49) of said sealing set (48) sealing abut against the inner bore surface of said bushing (38) in a manner such that the sealing and scraping functions of the seals are combined, whereby, when said sealing assembly is incorporated in the steered axle of the vehicle and the inner surface of said sleeve (42) is firmly secured to the movable component (25) and an exterior surface of said bushing (38) is firmly secured to the axle tube (3) and upon introduction of a steering movement of the movable component (25) during operation of the vehicle incorporating said sealing assembly (24), said sleeve (42) and said sealing set (48) are displaced to and fro along the inner surface of said bushing (38) from a first end of said bushing (38) located adjacent the outer space (21) toward an opposed end of said bushing (38) located adjacent an inner space (20), and a longitudinal distance between said scraping lip (49) and an adjacent one of said two sealing lips (52) of said shaft sealing ring (47), in relation to a longitudinal direction of said movable component (25), is greater than a longitudinal travel distance of said movable component (25) such that no overlap occurs between respective longitudinal paths of travel of said sealing lips (52) and said scraping lips (49).

* * * * *